(12) United States Patent
Prager

(10) Patent No.: US 7,832,015 B2
(45) Date of Patent: *Nov. 9, 2010

(54) METHOD AND SYSTEM FOR PROVIDING ACCESS TO COMPUTER RESOURCES THAT UTILIZE DISTINCT PROTOCOLS FOR RECEIVING SECURITY INFORMATION AND PROVIDING ACCESS BASED ON RECEIVED SECURITY INFORMATION

(75) Inventor: Scott Howard Prager, Stratham, NH (US)

(73) Assignee: International Business Machines Corporation, Armonk, NY (US)

( * ) Notice: Subject to any disclaimer, the term of this patent is extended or adjusted under 35 U.S.C. 154(b) by 1366 days.

This patent is subject to a terminal disclaimer.

(21) Appl. No.: 11/284,437

(22) Filed: Nov. 21, 2005

(65) Prior Publication Data

US 2006/0174131 A1 Aug. 3, 2006

Related U.S. Application Data

(63) Continuation of application No. 09/881,374, filed on Jun. 14, 2001, now Pat. No. 7,100,207.

(51) Int. Cl.
*G06F 7/04* (2006.01)
*G06F 11/30* (2006.01)

(52) U.S. Cl. .............................. 726/27; 726/2; 726/28; 713/187

(58) Field of Classification Search .................... 726/2, 726/27–30; 713/187
See application file for complete search history.

(56) References Cited

U.S. PATENT DOCUMENTS

| 5,534,855 | A | * | 7/1996 | Shockley et al. ........... 340/5.52 |
| 5,708,812 | A | * | 1/1998 | Van Dyke et al. ........... 717/171 |
| 6,629,142 | B1 | * | 9/2003 | Badami et al. .............. 709/225 |
| 6,681,034 | B1 | * | 1/2004 | Russo ......................... 382/125 |
| 6,823,389 | B1 | * | 11/2004 | Satomi et al. ............... 709/227 |
| 2002/0095571 | A1 | * | 7/2002 | Bradee ........................ 713/164 |

* cited by examiner

*Primary Examiner*—Kimyen Vu
*Assistant Examiner*—Suman Debnath
(74) *Attorney, Agent, or Firm*—Ostrow Kaufman & Frankl

(57) ABSTRACT

A method for providing a user with access to a plurality of computer resources, at least some of which utilize distinct protocols for receiving security information and for providing access to outside systems based on received security information. A request is received from the user identifying one of the plurality of computer resources. From a set of previously stored records each of which identifies one of the plurality of computer resources and contains security information for allowing access to the computer resource identified in the record, one of the records of the set is selected whose identification of one of the plurality of computer resources best matches the request's identification of one of the plurality of computer resources. The security information in the selected record is used to provide access to the computer resource identified in the request according to the distinct protocol utilized by that resource.

19 Claims, 7 Drawing Sheets

| Rec # | FES ID | Target Computer Resource Identity | | | | Security Information | |
|---|---|---|---|---|---|---|---|
| | | System | Server | Database | Table | User ID | Password |
| 2 | John Smith | DB/2 | COMP05 | | | temp | 999999 |
| 7 | John Smith | DB/2 | COMP01 | FINANCIALS01 | | jsmith | 433525 |
| 34 | John Smith | SAP | COMP03 | RECEIVABLES01 | DEC | sj7943 | 662532 |
| 48 | John Smith | Domino | | | | js | 7342 |

Fig. 3

| Request | FES ID | Resource Identification Information | | | |
|---|---|---|---|---|---|
| | | System | Server | Database | Table |
| A | John Smith | DB/2 | COMP01 | FINANCIALS01 | JAN |
| B | John Smith | Domino | COMP03 | RECEIVABLES01 | DEC |
| C | John Smith | DB/2 | COMP05 | PAYABLES97 | |

Fig. 7

METHOD AND SYSTEM FOR PROVIDING ACCESS TO COMPUTER RESOURCES THAT UTILIZE DISTINCT PROTOCOLS FOR RECEIVING SECURITY INFORMATION AND PROVIDING ACCESS BASED ON RECEIVED SECURITY INFORMATION

CROSS REFERENCE TO RELATED APPLICATION

The present application is a continuation of application Ser. No. 09/881,374, filed Jun. 14, 2001, now U.S. Pat. No. 7,100,207.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS-REFERENCE TO RELATED APPLICATIONS

This application is related to U.S. application Ser. No. 09/760,612, entitled "METHOD AND SYSTEM FOR VIRTUALIZING LOGIC BETWEEN DISPARATE SYSTEMS", filed Jan. 16, 2001, which is hereby incorporated by reference into this application.

BACKGROUND OF THE INVENTION

The invention disclosed herein relates generally to methods for providing access to secure computer systems. More particularly, the present invention relates to a system and method for using a first system to provide access to one or more secure, external systems by providing the best matching security information to the external systems.

Organizations often have computing environments comprising a number of different systems. Generally, security measures are employed to restrict access to the different systems, such as requiring a user to provide a distinct set of credentials (e.g., a user ID and password pair) to each system. Although such security measures increases the integrity of individual systems, they impede the ability of the individual systems to work together.

For example, a user may operate an application from a first system to create a document which incorporates data contained in a database of a second system. Absent security measures, the first system may simply communicate with the second system to receive the data needed to create the document. However, where security measures protect each system, the first system would need to first satisfy the second system's security measure predefined for the specific user prior to receiving the needed data.

Standards, such as X.509, exist which define how systems may exchange security information thereby allowing secure systems to communicate with each other. However, such standards have significant drawbacks.

For example, all systems involved must support the standard, i.e., they must all exchange security information according to the manner defined by the standard. Legacy systems often operate with their own security protocol, e.g., definition for receiving security information and providing access to external systems based on the received security information. For such legacy systems to be able to support a standard, such as X.509, significant code changes would be required.

Another drawback of such standards is their limited flexibility. In addition to limiting access to only authorized users, security measures can be used to define the level of access for those users, e.g., one user may be authorized to access the entire system while another user may only access a single database. Standards, such as described above, typically support only a single set of credentials per user per system. However, it may be desirable for the same user to have multiple sets of credentials, and thereby multiple levels of access, for the same system.

There is thus a need for a system and method for allowing a user to provide security information only once in order to access multiple secure systems that have distinct protocols for receiving security information and providing access to external systems based on the received security information without altering the secure systems to which access is desired. Also, there is a need for such a system and method to support using multiple sets of security information per user to gain access at varying levels to the same secure system.

BRIEF SUMMARY OF THE INVENTION

It is an object of the present invention to allow users to access multiple external systems in a way which avoids the drawbacks described above.

It is another object of the present invention to allow systems that use distinct protocols for receiving security information and providing access based on received security information to receive security information and provide access based on the received security information without modification of the systems.

It is another object of the present invention to allow a user having multiple sets of security information associated with the same secure system to gain access to the secure system with the level of access permitted by the secure system based on the specific set of security information used to gain access.

The above and other objects are achieved by a method for providing at least one user with access to a plurality of computer resources, at least some of which utilize distinct protocols for receiving security information and for providing access to outside systems based on received security information. The method involves receiving a request from the at least one user identifying one of the plurality of computer resources. Then, from a set of previously stored records each of which identifies one of the plurality of computer resources and contains security information for allowing access to the computer resource identified in the record, one of the records of the set is selected whose identification of one of the plurality of computer resources is related to the request's identification of one of the plurality of computer resources. Finally, the security information in the selected record is used to provide access to the computer resource identified in the request according to the distinct protocol utilized by that resource.

A front end system communicates with users and utilizes a security interface system to access secure computer resources on behalf of the users. Computer resource is here used broadly to mean any computer related resource, hardware and/or software, which a user may wish to access, including, for example, a computer system, a server of the system, an application or database on a server, a document, a content file, a table of a database, etc. Each computer resource may have a distinct security protocol which defines security information to be received from an entity requesting access and provides access to the requesting entity based on the received security information.

An interface, operably coupled to the security interface system, communicates with each computer resource and is capable of operating according to the distinct security protocol of each computer resource.

A database, accessible to both the security interface system and the interface, stores security information for each user that authorizes the user to access a computer resource. The database may comprise security records each of which identifies a user of the security information system, a computer resource, and the security information for allowing the user to access the computer resource.

In one embodiment in accordance with the invention, a method begins with a user performing an action at the front end that requires a secure computer resource to be accessed. A request is generated which identifies the user and identifies the resource to be accessed. The security interface system searches the database to identify all the records corresponding to the user associated with the request. From the identified records, the security interface system selects one record having a resource identification which best matches the resource identification from the request. Where resource identifications comprise a number of values, the record selected as the best match may be the record whose resource identification has the highest number of values that match the values comprising the request's resource identification. Alternatively, the record selected as the best match may be the record whose resource identification has the highest number of values that consecutively match the values comprising the request's resource identification. Other criteria may be used to determine whether a security record's resource identification best matches the request's resource identification as desired for a given system or purpose.

The interface then uses the security information in the selected record to communicate with the computer resource identified in the record to access that resource according to that resource's distinct security protocol.

The database may store, for the same user, multiple sets of credentials associated with the same computer resource. Factors, such as the specific action taken by the user while interacting with the front end, may cause the security interface system to communicate different sets of security information to the same computer resource with the computer resource granting different levels of access depending upon the specific set of security information received.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 3 is a table showing examples of records from a database;

FIG. 7 is a table showing example requests identifying computer resources to be accessed.

DETAILED DESCRIPTION OF THE PREFERRED EMBODIMENTS

The preferred embodiments of a method, system, and article of manufacture containing software programs in accordance with the present invention is described with reference to the drawings in FIGS. 1-7.

Figure 1:
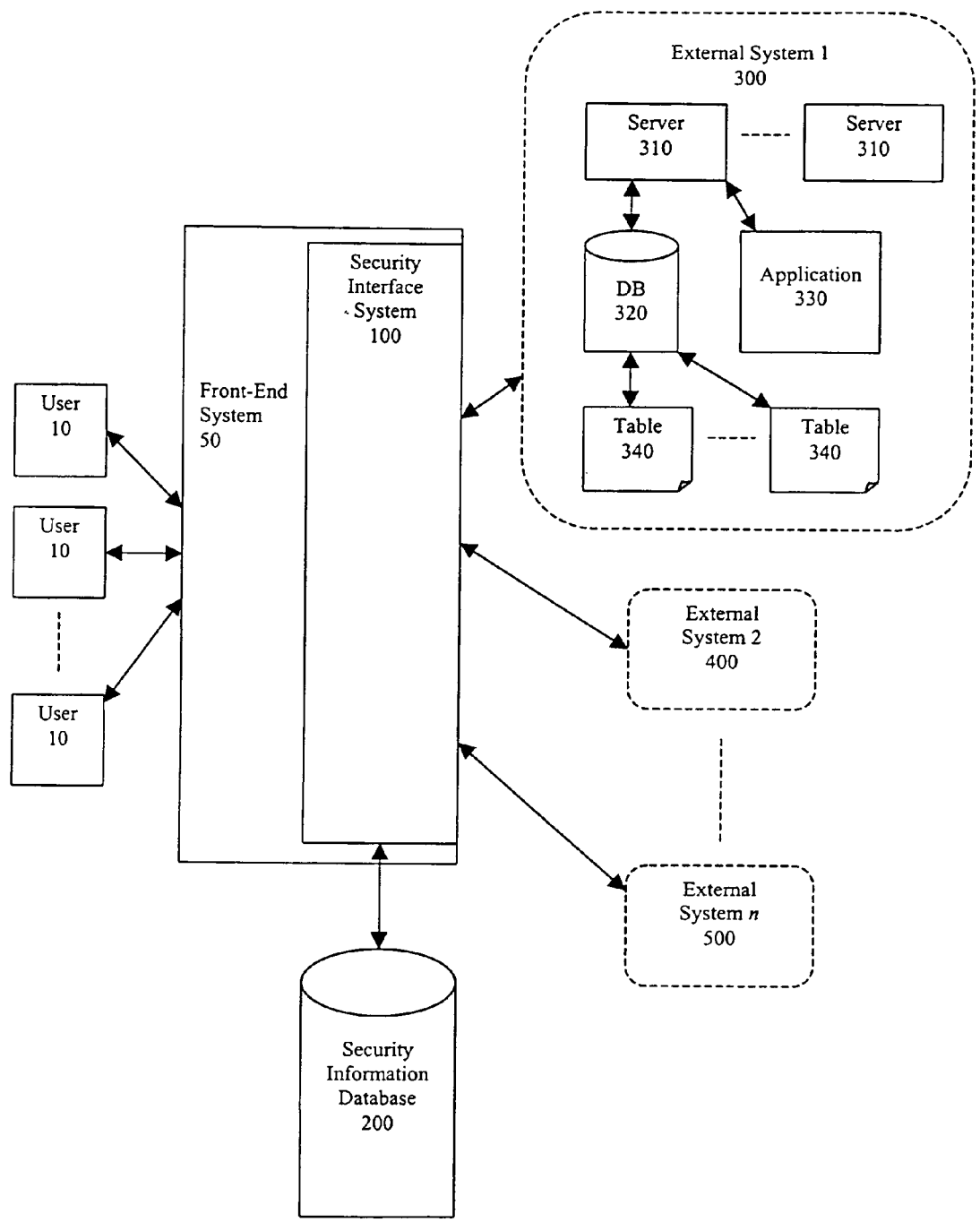
FIG. 1 is a block diagram showing an embodiment of the system of the present invention and the environment in which it operates.

FIG. 1 is a block diagram showing the structure and operating environment of an embodiment of the present invention. One or more users 10 communicate with a Front End System ("FES") 50. FES 50 may be any computer system that typically functions as a user front end, such as Lotus Notes, a browser, a database client, etc. The users 10 may operate any computer hardware and software that allows them to exchange data and interact with FES 50. For example, where a user 10 communicates with FES 50 over the Internet, the user may operate a personal computer with a standard web browser to enable it to exchange data and interact with FES 50. Alternatively, a user 10 may communicate with FES 50 over a LAN or WAN and operate the client version of a program, such as Lotus Notes.

FIG. 1 also shows a number of computer systems, labeled as External Systems ("ES") 1 through n and numbered 300, 400, and 500, respectively, to which one or more users 10 may desire access. Each ES may contain elements and sub-elements. For example, as shown with respect to ES 300, an ES may contain one or more servers 310, each of which may contain one or more databases ("DB") 320 and/or applications 330, with each database 320 containing one or more tables 340, etc.

Each ES may have its own unique security protocol which defines security information to be received from an outside system and provides access to the outside system based on the received security information. The security information may be used to restrict system access to only authorized users as well as determine the level of access for authorized users, e.g., system-wide access, access to only specific system elements or sub-elements, etc. One example of security information that may be used is a set of credentials assigned to a user, e.g., a user ID and password pair.

FES 50 has access to a Security Interface System ("SIS") 100. SIS 100 is a computer system which acts as an interface through which the one or more users 10 may gain access to the External Systems. Appropriate data communication links, such as a LAN, WAN, or the Internet, connect FES 50 and SIS 100 with the users 10 and the External Systems 1 through n.

SIS 100 may be any computer system capable of operating according to the security protocol of any External System to which access is desired. In other words, once SIS 100 is provided with security information for a user that targets an External System, SIS 100 is capable of communicating that security information to the targeted External System to thereby gain access to that External System on behalf of the user. For this purpose, SIS 100 contains means for allowing it to operate according to the security protocols of any External System desired.

Figure 2:
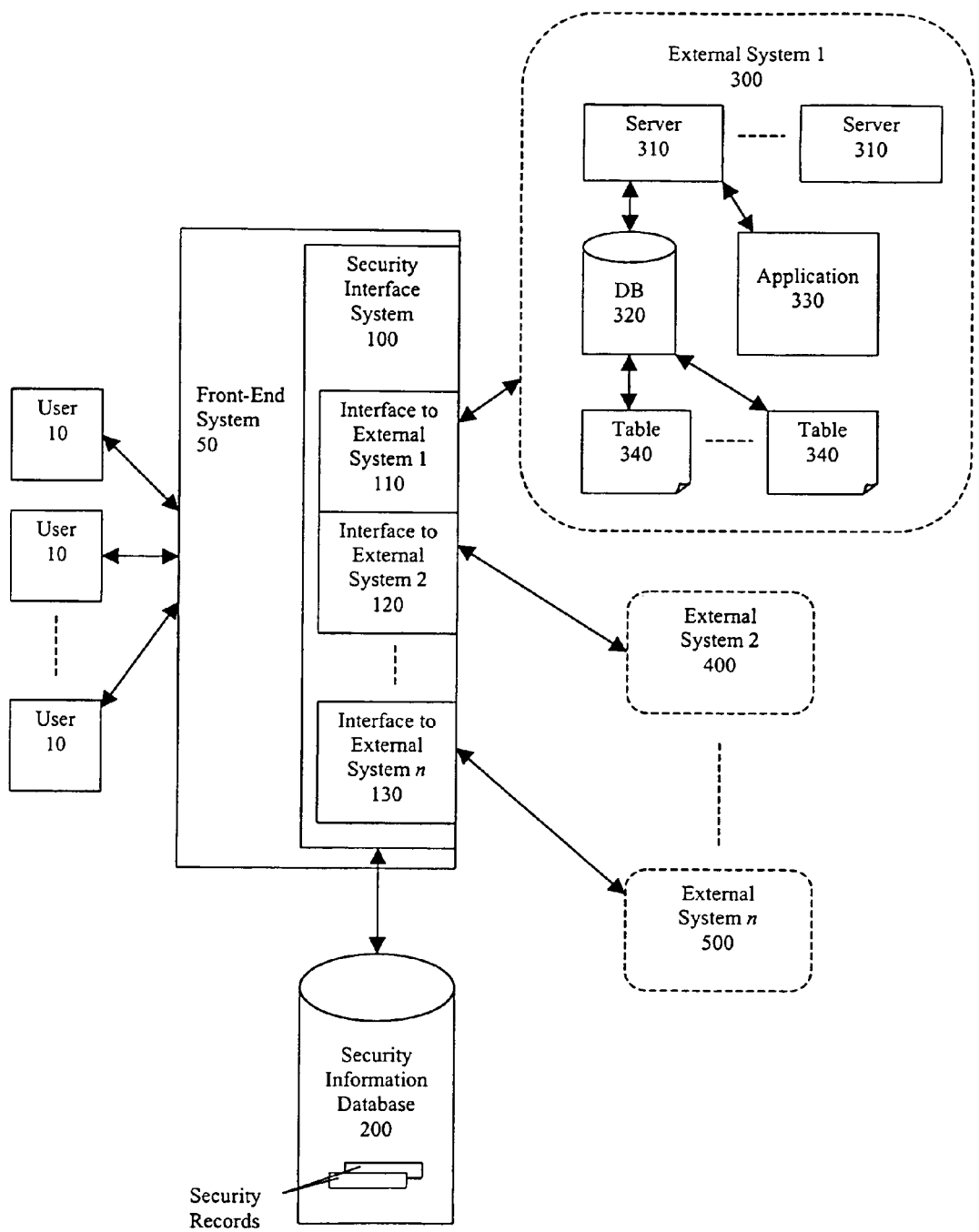
FIG. 2 is a block diagram showing another embodiment of the system of the present invention and the environment in which it operates.

FIG. 2 shows an embodiment of the present invention where SIS 100 comprises separate interfaces corresponding to each External System to which access is desired. Thus, interface 110 corresponding to External System 1 allows SIS 100 to operate according to the security protocol of External System 1, and interface 120 allows SIS 100 to operate according to the security protocol of External System 2, etc. For example, each interface may be computer code modules designed to allow SIS 100 to operate according to the security protocol of the External System to which the interface corresponds.

Computer system here is used broadly to mean computer hardware and software or computer software only. In FIGS. 1 and 2, FES 50 and SIS 100 are shown as distinct from the External Systems. However, it should be understood that FES 50 and SIS 100 may be co-resident in the same computer system with one or more of the External Systems.

Furthermore, although FIGS. 1 and 2 show SIS 100 as co-resident with FES 50, it should be understood that such an arrangement is not necessary. In one embodiment, SIS 100 may be a distinct computer program module contained within FES 50. Alternatively, SIS 100 may comprise computer code integrated with code comprising FES 50.

In another embodiment, SIS 100 may be a distinct system from FES 50. Thus, SIS 100 may act as a server in a multi-tiered environment where users interact with front-end systems that then send requests to SIS 100. SIS 100 then interacts with the External Systems to fulfill those requests and provides the results to the front-end systems.

As shown in FIGS. 1 and 2, SIS 100 has access to a database, Security Information ("SI") Database 200. Although SI Database 200 is shown as distinct from SIS 100, it should be understood that SI Database 200 may be co-resident with or part of SIS 100. Where SI Database 200 is distinct from SIS 100, an appropriate data communication link connects the two, such as a LAN, a WAN, or the Internet.

SI Database 200 stores at least two items of information: the identities of one or more target resources which a user is authorized to access; and security information associated with each identified target which allows a user to gain access to the identified target. Additionally, where a plurality of users access External Systems through SIS 100, SI Database 200 also stores user identities which serve to uniquely identify the user to SIS 100. This user identity may be called the user's SIS ID.

The target identity stored may be information that uniquely identifies a computer resource to SIS 100. A computer resource may be any computer related resource, software and/or hardware, to which a user may wish to gain access and may include, for example, an entire computer system or any element or sub-element within a system, such as a server, a computer application or a database on a server, a table of a database, etc. For example, a computer resource may be the entire External System 1, or a server 310 in External System 1, or a database on the server, or a table of the database, etc.

The security information stored for a user and associated with a target may be information that allows the user to gain access to the associated target computer resource. For example, the security information may be a set of credentials, e.g., a user ID and password pair, where the user ID has been predefined for the user for the specific target computer resource and may be distinct from the user's SIS ID.

In an embodiment of the present invention, SI Database 200 may contain one or more security records for each user, where each record contains: (1) the user's SIS ID; (2) the identity of one target computer resource; and (3) security information allowing the user identified in the record to gain access to the target computer resource identified in the record. Consequently, SI Database 200 contains a record for each target computer resource that each user is authorized to access.

Also, SI Database 200 may store multiple sets of security information for each user for the same computer system. As described further below, this allows the computer system to restrict the level of access for the user based on which set of security information is received.

FIG. 3 is a table showing several examples of records that may be stored in SI Database 200. The first column of the record contains the record ID number, which may be a key assigned to each record, e.g., sequentially at the time it is created. The records shown in FIG. 3 all correspond to a single user having the SIS ID "John Smith". Each security record also contains information identifying a target resource. As shown in FIG. 3, this target identification information may comprise several fields, such as, for example, system name, server name, database name, table name, etc. Finally each security record contains security information, such as a set of credentials, allowing the identified user to gain access to the identified target resource.

Data input and database management may be implemented in any appropriate manner. For example, each individual user may enter his or her own corresponding information into SI Database 200 or a central authority, such as an organization's information technology department, may control such activity. SIS 100 may be used by individual users or the central authority to add, edit, or delete records from SI Database 200, and SIS 100 may include components, such as a user interface, an editor, etc., for this purpose. In addition, a security scheme may be implemented to control access to the records. For example, record level security could be used to limit any individual's ability to access and/or edit records on a record-by-record basis. However, it may be desirable to provide that an individual user always maintains the right to access and edit his or her own records.

Figure 4:
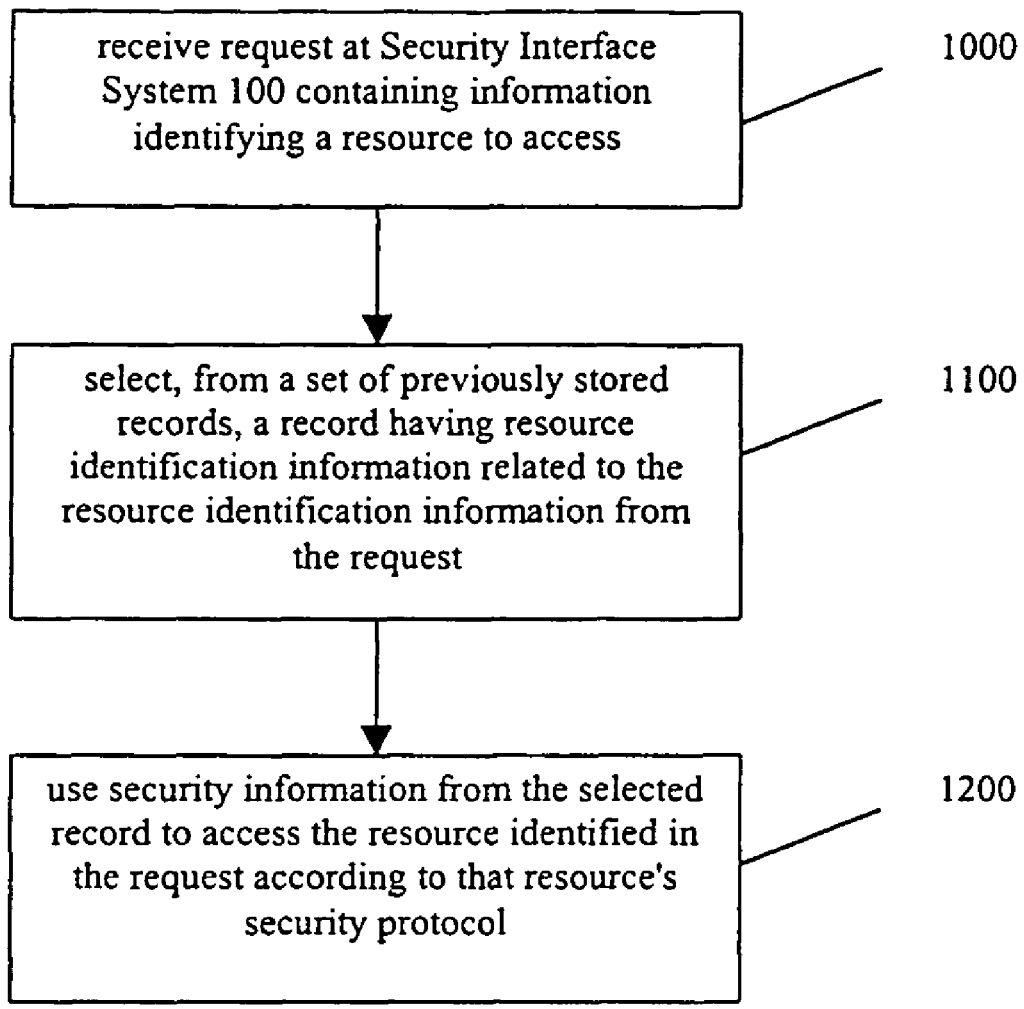
FIG. 4 is a flow chart showing a process for accessing a computer resource in accordance with one embodiment of the present invention.

The general operation of the Security Interface System 100 of the present invention may now be described with reference to the flowchart of FIG. 4. First, SIS 100 receives a request that contains information identifying a resource to access, such as a target resource, step 1000. Such a request may be generated, for example, in response to an action performed by a user interacting with FES 50. For instance, a user interacting with FES 50 may direct FES 50 to access a computer resource by making a selection from a list at a pull-down menu. Alternatively, the user may direct FES 50 to create a report using data that is indicated by an internal table within FES 50 as being stored in a particular computer resource. Additionally, the request may be generated by a variety of sources, such as a user interface component of FES 50, or the client software being operated at the user's machine.

After receiving the request, SIS 100 selects from a set of previously stored records, one of the records having target computer resource identity information that relates to the resource identification information contained in the request, step 1100. As described above, these records may be stored in SIS 100 or in a separate SI Database 200. Also, the resource identification information of the request may relate to the target computer resource identity information of the selected record in a number of ways, such as being an exact match.

Once a record is selected, SIS 100 uses the security information from the selected record to gain access to the target computer resource identified in the record by operating according to the target resource's own security protocol, step 1200. Where the request received indicates a particular operation to be performed, e.g., read data, store data, delete file, etc., then once SIS 100 gains access to the target resource, SIS 100 performs the operation indicated by the request on the target resource. Alternatively, another entity in communication with SIS 100, such as FES 50, may perform the indicated operation once access is obtained via SIS 100.

Figure 5:
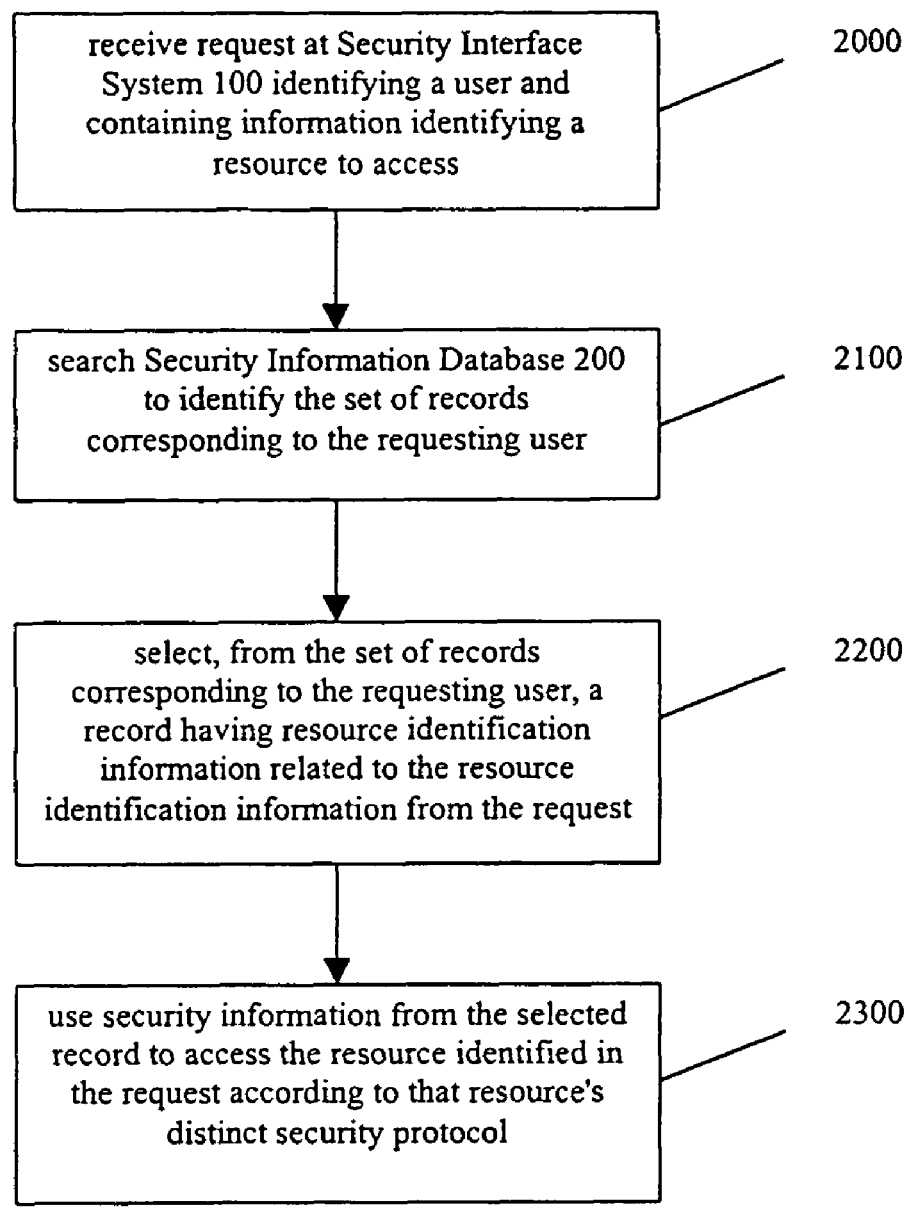
FIG. 5 is a flow chart further showing a process for accessing a computer resource in accordance with one embodiment of the present invention.

FIG. 5 shows a flowchart describing the operation of another embodiment of the present invention. At step 2000, SIS 100 receives a request identifying a resource to access and also identifies one of a plurality of users making the request. For example, the request may include the SIS ID of the requesting user. Next, SIS 100 searches SI Database 200 to identify the set of records corresponding to the user identified in the request, step 2100. For example, SIS 100 may identify all the records in SI Database 200 containing a SIS ID that matches the SIS ID from the request. From this set of records, SIS 100 selects one record whose target computer resource identity information relates to the resource identification information of the request, step 2200. Once a record is selected, SIS 100 uses the security information from the selected record to gain access to the target computer resource identified in the record by operating according to the target resource's own security protocol, step 2300. Once access is gained, SIS 100, or another entity in communication with SIS 100, performs an operation against the target resource.

The record selected in step 2200 may contain target computer resource identity information that relates in any number of ways to the resource identification information of the request. Aside from an exact match, the selected record may contain target computer resource identity information that is a "best match" to the request's resource identification information.

Figure 6A:
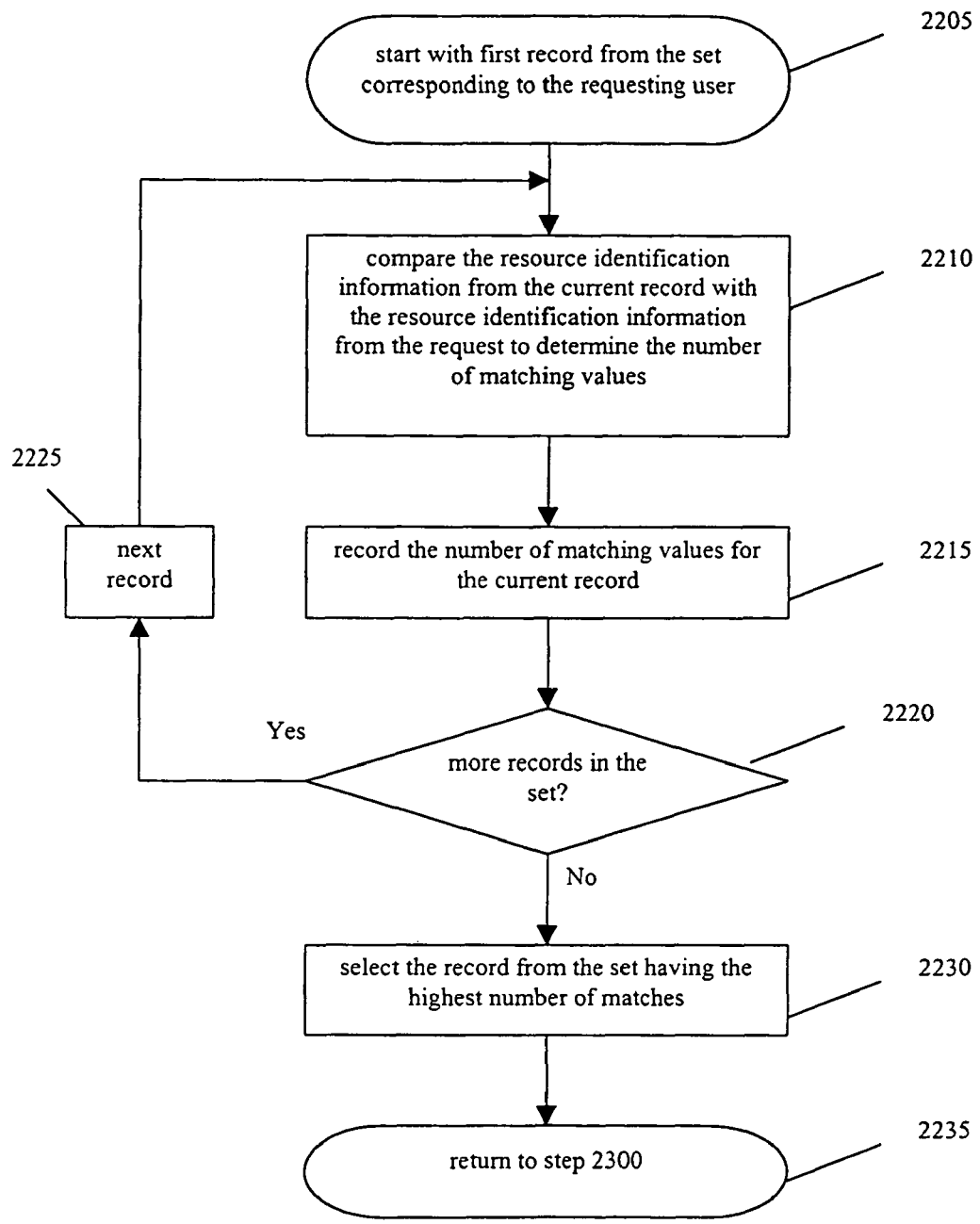
FIG. 6A is a flow chart showing an operative embodiment of the present invention.

FIG. 6A shows a flowchart that describes one embodiment of the invention for determining a "best match" based on the number of matching fields of identification information. Beginning with the first record of the identified set of records, step 2205, the target computer resource identity information of the record is compared with the resource identification information from the request and the number of matching values is determined, step 2210, and the number of matching values for the record is stored, step 2215. A check is made to determine if there are more records in the set of records corresponding to the user of the request, step 2220. If there are records remaining in the set, then the next record is obtained, step 2225, and processing returns to step 2220. If there are no more records in the set, the record having the highest number of matches is selected, step 2230. Processing then returns to step 2300 of FIG. 5, step 2235.

The processing of FIG. 6A can be further explained with reference to FIGS. 7 and 3. FIG. 7 is a table showing examples of requests that may be received at FES 100. Comparing example Request A to each example record of FIG. 3, it can be seen that Record #2 contains one matching value (system name="DB/2"), Record #7 contains three matching values (system name="DB/2", server name="COMP01", and database name="FINANCIALS01"), and Records #34 and #48 contain zero matching values. Since Record #7 contains the highest number of matching values, Record #7 is selected from the set as the "best match". Consequently, at step 2300 of FIG. 5, SIS 100 will use the credential set from Record #7 (i.e., user ID="jsmith" and password="433525") to attempt to gain access to the target computer resource identified as table "JAN" of database "FINANCIALS01" on server "COMP01" of system "DB/2".

Figure 6B:
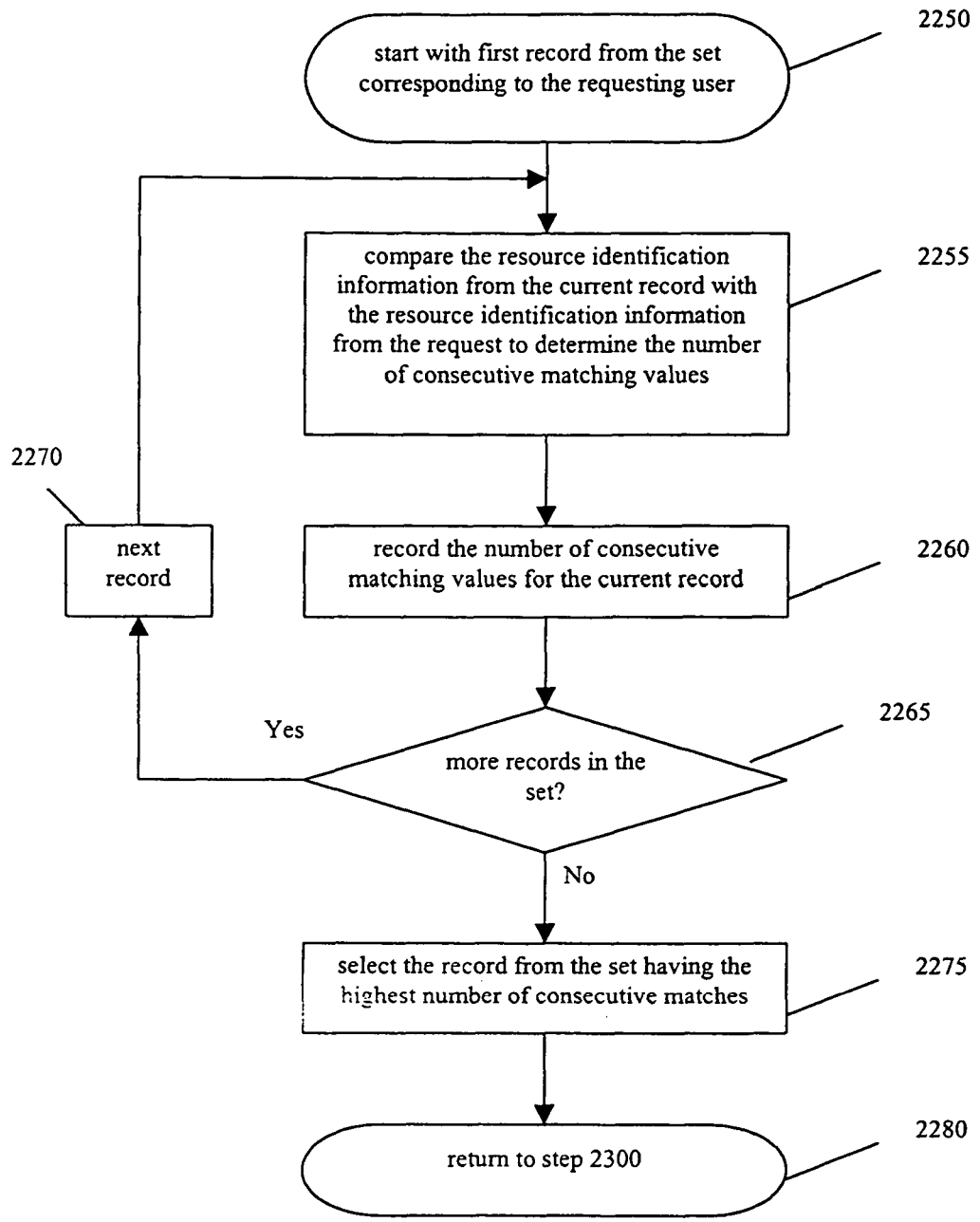
FIG. 6B is a flow chart showing another operative embodiment of the present invention.

FIG. 6B shows a flowchart that describes another embodiment of the invention for determining a "best match" based on the number of consecutive matching fields of identification information. Beginning with the first record of the identified set of records, step 2250, the target computer resource identity information of the record is compared with the resource identification information from the request and the number of consecutive matching values is determined, step 2255, and the number of consecutive matching values for the record is stored, step 2260. A check is made to determine if there are more records in the set of records corresponding to the user of the request, step 2265. If there are records remaining in the set, then the next record is obtained, step 2270, and processing returns to step 2255. If there are no more records in the set, the record having the highest number of consecutive matches is selected, step 2275. Processing then returns to step 2300 of FIG. 5, step 2280.

The processing of FIG. 6B again can be further explained with reference to FIGS. 7 and 3. Comparing example Request A to each example record of FIG. 3, it can be seen that Record #2 contains one consecutive matching value (system name="DB/2"), Record #7 contains three consecutive matching values (system name="DB/2", server name="COMP01", and database name="FINANCIALS01"), and Records #34 and #48 contain zero matching values. Since Record #7 contains the highest number of consecutive matching values, Record #7 is selected from the set as the "best match". Consequently, at step 2300 of FIG. 5, SIS 100 will use the credential set from Record #7 to attempt to gain access to the target computer resource identified in the Request A.

Comparing example Request B to each example record of FIG. 3, it can be seen that Records #2, #7, and #34 contain zero consecutive matching values and Record #48 contains one consecutive matching value (system name="Domino"). Note that for Record #34, even though the server name, database name, and table name fields match the corresponding fields values of Request B, since the first field of the record (system name) does not match, no consecutive matches are recorded. Thus, it is assumed that there is a hierarchical importance to the sequence of the fields in the records. Since Record #48 contains the highest number of consecutive matching values, Record #48 is selected from the set as the "best match" and the credential set from that record is used to attempt to gain access to the target computer resource identified in the Request B.

Comparing example Request C to each example record of FIG. 3, it can be seen that Record #2 contains two consecutive matching values (system name="DB/2" and server name="COMP05"), Record #7 contains one consecutive matching value (system name="DB/2") and Records #34 and #48 contain zero consecutive matching values. Since Record #2 contains the highest number of consecutive matching values, Record #2 is selected from the set as the "best match" and the credential set from that record is used to attempt to gain access to the target computer resource identified in the Request C.

As stated previously, the present invention supports multiple sets of security information for the same user for the same system and this allows for that user to have differing levels of access to the same system. For instance, a system may provide access based on the credentials received.

For example, user "John Smith" is a designated user of "FINANCIALS01" database on server "COMP01" of system "DB/2". Therefore, "John Smith" is authorized to access any table of that database and this level of access is reflected in predefined security information, i.e., user ID="jsmith" and password="433525". However, "John Smith" also occasionally requires access to non-sensitive information stored on server "COMP01" of the system "DB/2". For this purpose, "John Smith" is provided another set of security information, i.e., user ID="temp" and password="999999", which authorizes him to access information on server "COMP01" that has been defined as "public".

Referring again to FIGS. 7 and 3, if "John Smith" directs FES 50 to create a report of financial data for January 2001, a request, such as Request A, may be generated and received by SIS 100. As described above, Record #7 would be selected and SIS 100 would communicate user ID "jsmith" and password "433525" to system "DB/2" and request access to table "JAN" of database "FINANCIALS01" on server "COMP01". Since that user ID and password is authorized to access every table of that database, system "DB/2" would allow access to the requested table.

However, if "John Smith" directs FES 50 to create a report of payables data for all of 1997, a request, such as Request C, may be generated. SIS 100 would select Record #2 as the "best match" and communicate user ID "temp" and password "999999" to system "DB/2" and request access to all tables of database "PAYABLES97" on server "COMP05". Since that user ID and password pair is authorized to access only "public" data, system "DB/2" would grant access to database "PAYABLES97" only if the database were designated as "public" and then would grant access to only those tables of database "PAYABLES97" that were also designated as "public".

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for providing at least one user with access to a plurality of computer resources, at least some of which utilize distinct protocols for receiving security information and for providing access to outside systems based on received security information, the method comprising:

receiving a request from the at least one user identifying one of the plurality of computer resources;

from a set of previously stored records each of which identifies one of the plurality of computer resources and contains security information for allowing access to the computer resource identified in the record, the computer resource using a distinct protocol from the rest of the plurality of computer resources to receive security information, wherein at least two records identify the same computer resource to allow different levels of access to the same computer resource by the at least one user for each of the records, selecting one of the records of the set whose identification of one of the plurality of computer resources is related to the request's identification of one of the plurality of computer resources; and using the security information in the selected record to provide access to the computer resource identified in the request according to the distinct protocol utilized by that resource.

2. The method of claim 1, wherein the request identifies a specific user;

wherein the set of previously stored records is part of a database of records and each record of the database identifies one of the users, identifies one of the plurality of computer resources, and contains security information for allowing the user identified in the record to access the computer resource identified in the record; and wherein the set of previously stored records is obtained by identifying the records in the database whose identified user corresponds to the user identified in the request.

3. The method of claim 2, wherein the request's identification of one of the plurality of computer resources comprises one or more values;

wherein, for each record of the database, the record's identification of one of the plurality of computer resources comprises one or more values; and wherein the step of selecting one of the records of the set comprises:

for each record of the set, comparing the one or more values from the record with the one or more values from the request to determine the number of matches between the values from the record and the values from the request; and wherein the selected record is the record whose values have the highest number of matches with the values from the request.

4. The method of claim 2, wherein the request's identification of one of the plurality of computer resources comprises one or more values;

wherein, for each record of the database, the record's identification of one of the plurality of computer resources comprises one or more values; and wherein the step of selecting one of the records of the set comprises:

for each record of the set, comparing the one or more values from the record with the one or more values from the request to determine the number of consecutive matches between the values from the record and the values from the request; and wherein the selected record is the record whose values have the highest number of consecutive matches with the values from the request.

5. A method for providing at least one user with access to a plurality of computer resources, at least some of which utilize distinct protocols for receiving security information and for providing access to outside systems based on received security information, the method comprising:

receiving a request from the at least one user containing one or more values which identify one of the plurality of computer resources;

from a set of previously stored records each of which contains one or more values that identifies one of the plurality of computer resources and contains security information for allowing access to the computer resource identified in the record, the computer resource using a distinct protocol from the rest of the plurality of computer resources to receive security information, wherein at least two records identify the same computer resource to allow different levels of access to the same computer resource by the at least one user for each of the records, selecting one of the records of the set by comparing, for each record of the set, the one or more values from the record with the one or more values from the request to determine the number of matching values and choosing the record having the highest number of matching values; and using the security information in the selected record to provide access to the computer resource identified in the request according to the distinct protocol utilized by that resource.

6. A method for providing at least one user with access to a plurality of computer resources, at least some of which utilize distinct protocols for receiving security information and for providing access to outside systems based on received security information, the method comprising:

receiving a request from the at least one user containing one or more values which identify one of the plurality of computer resources;

from a set of previously stored records each of which contains one or more values that identifies one of the plurality of computer resources and contains security information for allowing access to the computer resource identified in the record, the computer resource using a distinct protocol from the rest of the plurality of computer resources to receive security information, wherein at least two records identify the same computer resource to allow different levels of access to the same computer resource by the at least one user for each of the records, selecting one of the records of the set by comparing, for each record of the set, the one or more values from the record with the one or more values from the request to determine the number of consecutive matching values and selecting the record having the highest number of consecutive matching values; and using the security information in the selected record to provide access to the computer resource identified in the request according to the distinct protocol utilized by that resource.

7. A system for providing at least one user with access to a plurality of computer resources, at least some of which utilize distinct protocols for receiving security information and for providing access to outside systems based on received security information, the system comprising:

a computer system comprised of:
 a security interface in communication with the at least one user, and
 a resource interface in communication with each of the plurality of computer resources and capable of operating according the distinct protocol utilized by each computer resource; and a database storing a set of previously stored records each of which identifies one of the plurality of computer resources and contains security information for allowing access to the computer resource identified in the record, the computer resource using a distinct protocol from the rest of the plurality of computer resources to receive security information, wherein at least two records identify the same computer resource to allow different levels of access to the same computer resource by the at least one user for each of the records;

wherein upon receiving a request from the at least one user identifying one of the plurality of computer resources, the security interface selects one of the records of the set whose identification of one of the plurality of computer resources is related to the request's identification of one of the plurality of computer resources and causes the resource interface to use the security information in the selected record to provide access to the computer resource identified in the request according to the distinct protocol utilized by that resource.

8. The system of claim 7, wherein the resource interface comprises a separate interface module corresponding to each computer resource.

9. The system of claim 7, wherein the set of records is stored in the security interface.

10. The system of claim 7, wherein the set of records is stored in a separate database.

11. A system for providing at least one user with access to a plurality of computer resources, at least some of which utilize distinct protocols for receiving security information and for providing access to outside systems based on received security information, the system comprising:

means for receiving a request from the at least one user identifying one of the plurality of computer resources;

means for selecting, from a set of previously stored records each of which identifies one of the plurality of computer resources and contains security information for allowing access to the computer resource identified in the record, the computer resource using a distinct protocol from the rest of the plurality of computer resources to receive security information, wherein at least two records identify the same computer resource to allow different levels of access to the same computer resource by the at least one user for each of the records, one of the records of the set whose identification of one of the plurality of computer resources is related to the request's identification of one of the plurality of computer resources; and means for using the security information in the selected record to provide access to the computer resource identified in the request according to the distinct protocol utilized by that resource.

12. The system of claim 11, wherein each record's identification comprises one or more values;

wherein the request's identification comprises one or more values; and wherein the means for selecting selects the record of the set whose identification is related to the request's identification by comparing, for each record of the set, the one or more values from the record with the one or more values from the request to determine the number of matching values and choosing the record having the highest number of matching values.

13. The system of claim 11, wherein each record's identification comprises one or more values;

wherein the request's identification comprises one or more values; and wherein the means for selecting selects the record of the set whose identification is related to the request's identification by comparing, for each record of the set, the one or more values from the record with the one or more values from the request to determine the number of consecutive matching values and choosing the record having the highest number of consecutive matching values.

14. A computer usable medium having computer readable code embodied therein, the computer readable code, when executed, causing a computer to implement a method for providing at least one user with access to a plurality of computer resources, at least some of which utilize distinct protocols for receiving security information and for providing access to outside systems based on received security information, the method comprising:

receiving a request from the at least one user identifying one of the plurality of computer resources;

selecting, from a set of previously stored records each of which identifies one of the plurality of computer resources and contains security information for allowing access to the computer resource identified in the record, the computer resource using a distinct protocol from the rest of the plurality of computer resources to receive security information, wherein at least two records identify the same computer resource to allow different levels of access to the same computer resource by the at least one user for each of the records, one of the records of the set whose identification of one of the plurality of computer resources is related to the request's identification of one of the plurality of computer resources; and using the security information in the selected record to provide access to the computer resource identified in the request according to the distinct protocol utilized by that resource.

15. The computer usable medium of claim 14, wherein the request identifies a specific user;

wherein the set of previously stored records is part of a database of records and each record of the database identifies one of the users, identifies one of the plurality of computer resources, and contains security information for allowing the user identified in the record to access the computer resource identified in the record; and wherein the set of previously stored records is obtained by identifying the records in the database whose identified user corresponds to the user identified in the request.

16. The computer usable medium of claim 15, wherein the request's identification of one of the plurality of computer resources comprises one or more values;

wherein, for each record of the database, the record's identification of one of the plurality of computer resources comprises one or more values; and wherein the step of selecting one of the records of the set comprises:

for each record of the set, comparing the one or more values from the record with the one or more values from the request to determine the number of matches between the values from the record and the values from the request; and wherein the selected record is the record whose values have the highest number of matches with the values from the request.

17. The computer usable medium of claim 15, wherein the request's identification of one of the plurality of computer resources comprises one or more values;

wherein, for each record of the database, the record's identification of one of the plurality of computer resources comprises one or more values; and wherein the step of selecting one of the records of the set comprises:

for each record of the set, comparing the one or more values from the record with the one or more values from the request to determine the number of consecutive matches between the values from the record and the values from the request; and wherein the selected record is the record whose values have the highest number of consecutive matches with the values from the request.

18. A method for providing at least one user with access to a plurality of computer resources, at least some of which utilize distinct protocols for receiving security information and for providing access to outside systems based on received security information, the method comprising:

receiving a request from the at least one user containing one or more values which identify one of the plurality of computer resources;

from a set of previously stored records each of which contains one or more values that identifies one of the plurality of computer resources and contains security information for allowing access to the computer resource identified in the record, the computer resource using a distinct protocol from the rest of the plurality of computer resources to receive security information, selecting one of the records of the set by comparing, for each record of the set, the one or more values from the record with the one or more values from the request to determine the number of matching values and choosing the record having the highest number of matching values; and using the security information in the selected record to provide access to the computer resource identified in the request according to the distinct protocol utilized by that resource.

19. A method for providing at least one user with access to a plurality of computer resources, at least some of which utilize distinct protocols for receiving security information and for providing access to outside systems based on received security information, the method comprising:

receiving a request from the at least one user containing one or more values which identify one of the plurality of computer resources;

from a set of previously stored records each of which contains one or more values that identifies one of the plurality of computer resources and contains security information for allowing access to the computer resource identified in the record, the computer resource using a distinct protocol from the rest of the plurality of computer resources to receive security information, selecting one of the records of the set by comparing, for each record of the set, the one or more values from the record with the one or more values from the request to determine the number of consecutive matching values and selecting the record having the highest number of consecutive matching values; and using the security information in the selected record to provide access to the computer resource identified in the request according to the distinct protocol utilized by that resource.

* * * * *